J. S. ROWELL.

CULTIVATOR TOOTH.

No. 10,076. Reissued Apr. 4, 1882.

WITNESSES—
F. W. Adams
W. C. Adams

INVENTOR—
John S. Rowell
per W. E. Dexter
Attorney

N. PETERS, Photo-Lithographer, Washington, D. C.

UNITED STATES PATENT OFFICE.

JOHN S. ROWELL, OF BEAVER DAM, WISCONSIN.

CULTIVATOR-TOOTH.

SPECIFICATION forming part of Reissued Letters Patent No. 10,076, dated April 4, 1882.

Original No. 232,850, dated October 5, 1880. Application for reissue filed October 27, 1881.

*To all whom it may concern:*

Be it known that I, JOHN S. ROWELL, of Beaver Dam, in the county of Dodge and State of Wisconsin, have invented certain new and useful Improvements in Cultivator-Teeth; and I do hereby declare that the following is a full, clear, and exact description thereof, reference being had to the accompanying drawings, and to the letters of reference marked thereon, which form a part of this specification.

The invention relates to double pointed reversible cultivator-teeth, and to the combination of such teeth with a beam and an intermediate slipping plate, by which plate the tooth may be detachably held at any desired angle with the beam, subject to yield when it strikes an obstacle; and it consists in the features of construction and in the several combinations of parts hereinafter fully set forth, and stated in the claims.

Figure 1:
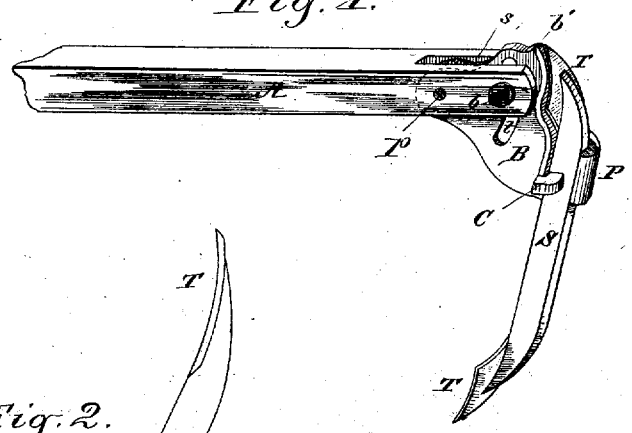
Figure 2:
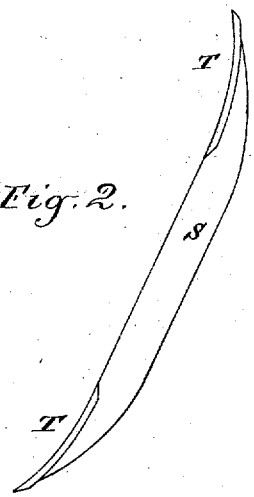
Figure 3:
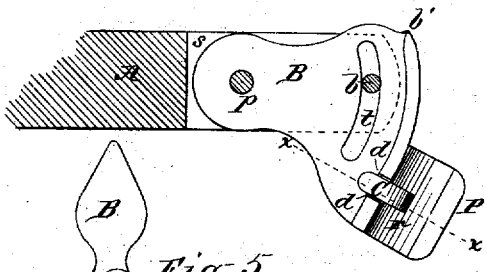
Figure 4:
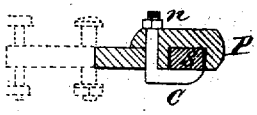
Figure 5:
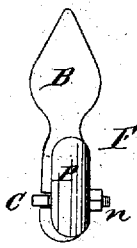

Figure 1 of the drawings shows the double-pointed reversible tooth secured to a beam by an intermediate slipping plate. Fig. 2 shows the double-pointed tooth detached. Fig. 3 is a side elevation of the slipping plate in place. Fig. 4 is a horizontal section of the slipping plate and the tooth-shank in place thereon in the line *x x* of Fig. 3, showing more clearly the clamping-bolt by which the latter is detachably held. Fig. 5 is a rear elevation of the slipping plate.

A is a wooden cultivator-beam, having an open slot, *s*, at its rear end.

B is a broad flat plate, set in the slot and pivoted at *p*. Said plate has the slot *t* concentric with the pivot *p*, through which slot passes the bolt *b*, serving to compress the divided parts of the beam against the flat and parallel sides of the plate.

S is the metal body or shank of the tooth, preferably of uniform size throughout its straight portion, fitted to enter between the shoulders of the lateral recess *r* in the rear projection, P, of the plate B, as shown. The tooth-shank S is provided with the plow-teeth T at both ends, and is rigidly held within the recess *r* by means of a clamping-bolt, C, which passes through the plate B at one side of the recess and bears by its head C upon the outer face of the shank, being tightened by the nut *n*. Said bolt C is held from turning off the tooth by means of the shoulders *d*, raised on the plate B; or it may have its tang squared for a short distance beneath the head and enter a correspondingly-shaped hole in the plate. The tooth-shank S is curved at its ends to properly support the teeth T, which are made of steel, usually in diamond form and curved, as indicated in the drawings. So far as concerns the combination of the reversible tooth as a whole with the slipping plate and beam, these teeth may be rigidly secured to the shank, as shown, or they may be each double-pointed and reversibly secured to the shank.

By means of the fastening devices described the double-pointed tooth-shank S may be at any time turned end for end at will with the aid only of a suitable wrench fitted to the nut *n* and without disturbing the connection of the plate with the beam. Not only will this be found of great advantage in the field when at a distance from other means of repair a tooth may break; but the capacity of the implement for wear is generally thereby doubled.

If desired, teeth of different shapes, adapted to different kinds of work or soil, may be applied to the opposite ends of the shank, so that the cultivator as a whole is made changeable, at little increase of cost and with little trouble to the owner, from one use or kind of work to another.

I wish to clearly distinguish this invention from the well-known double-toothed point, which is a reversible double-pointed blade attached movably at one end of a tooth-shank corresponding to the shank S in the present drawing. My invention distinctly contemplates a tooth at each end of the ordinary shank, or a shank similar in dimensions and function to the shank of a cultivator-tooth, as heretofore commonly constructed.

As compared with a reversible double tooth-point movably attached to one end of a shank, the double solid pointed tooth illustrated has the advantage of greater simplicity and strength in construction, of being more readily and conveniently reversed, and also of being free from liability to a break that may render both points of a reversible tooth-blade useless.

In addition to the reversible feature mentioned, the double-pointed tooth described, movably held, as shown, is readily adjustable to any desired length, whichever tooth-point is being used, without varying its angle with the beam, as is commonly done in the use of the ordinary single-pointed slip-tooth made in a single piece. The shank S being made of the length usually preferred, however, the upper blade, T, will ordinarily set down opposite the slipping plate, as shown in Fig. 1, and for the purpose of furnishing a guard to the upper point when in this position the plate B rises at *b'* flush with or a little above the said point resting against it, as also seen in Fig. 1. I have further shown the rear face of the plate B curved to conform with the curve of the tooth-points, and in Fig. 5, which is a rear view of a plate, B, the rear face of said plate is represented as being also widened, so as to guard the edges as well as the point of the tooth resting against it. By thus providing a guard for the upper or unused tooth-point said point is alike prevented from doing or receiving injury.

I claim as my invention—

1. The double-pointed reversible tooth described, consisting of the metal shank S, having fixed similarly-curved shovel-points T at its opposite ends, the whole constituting a unitary structure of substantially the usual length of seeder-teeth, combined with a slipping plate adapted to hold the tooth by clamping near its upper point, substantially as described.

2. In combination with a beam and with a plate having a slipping connection with the beam, a double-bladed tooth, S T, detachably and reversibly secured to the slipping plate by a fastening independent of the fastening which secures the plate to the beam, whereby the tooth may be reversed without disturbing the plate, substantially as described.

3. The combination of the cleft-beam A, slipping plate B, clamped within and extending out of the beam-cleft, the double-pointed reversible tooth S T, fitted to the protruding portion of the slipping plate, and mechanism for detachably securing the tooth to the exposed part of the plate, substantially as and for the purposes specified.

4. In combination with a cultivator-beam and with a double shovel-pointed reversible tooth, S T, an intermediate plate having a slipping connection with the beam, a fastening for rigidly but detachably securing the tooth to the plate, and means for guarding the upper tooth-point, substantially as set forth.

5. In combination with the beam and with a double-pointed reversible tooth, S T, having similar curved shovel-points, a plate having a slipping attachment with the beam, and a fastening for holding the tooth by its upper end to the plate, said slipping plate being extended to afford a guard to the unused tooth-point.

6. In combination with a beam and with a double shovel-pointed reversible tooth, S T, a plate having a slipping connection with the beam and rigid detachable connection with the tooth, said plate being extended and arranged to hold the tooth at the rear of the beam, substantially as described.

7. The slotted beam A, the pivoted slipping plate B, slotted to receive the binding-bolt *b* and provided with the clamping-bolt C, and shoulders outside of the beam, combined with the adjustable or reversible tooth S T, rigidly but removably secured thereto, substantially as described.

8. The slipping plate B, adapted to be pivoted at its front end by bolt *p* and provided with slot *t*, whereby the clamping-bolt *b* may pass through said plate, combined with a hooking-shoulder, P, and hook-headed clamp-bolt C, whereby the shank S may be firmly but detachably held, substantially as described.

9. Combined with the reversible tooth S T, a slipping plate, B, adapted to be located in a cleft in the beam A and provided with a hooking-shoulder, P, offset laterally from said plate, and the clamp-bolt C, whereby the shank S will be held in line with said plate, but capable of adjustment up and down thereon, as shown.

10. Combined with the reversible tooth S T, the slipping plate B, constructed with laterally-projecting flanges along its rear edge, whereby the unused tooth is guarded while the machine is in operation.

11. A slipping plate, B, pivoted and clamped within a cleft in the beam A by separate bolts and provided with a holding-shoulder, P, and clamp-bolt C, in combination with the reversible tooth S T, as set forth.

In testimony that I claim the foregoing as my invention I affix my signature in presence of two witnesses.

JOHN S. ROWELL.

Witnesses:
L. W. BARBER,
H. W. KEYES.